Reissued Oct. 4, 1938

Re. 20,877

UNITED STATES PATENT OFFICE 20,877

CAST METALLIC DENTURE

Charles H. Prange, Lyndhurst, N. J., assignor to Austenal Laboratories, Inc., New York, N. Y., a corporation of New York No Drawing. Original No. 1,958,446, dated May 15, 1934, Serial No. 599,071, March 15, 1932. Application for reissue April 9, 1936, Serial No. 73,586

5 Claims. (Cl. 32—2)

My present invention relates generally to dental appliances, and has particular reference to dental castings of an improved character and to the method of producing the same.

In the production of dentures, either partial or whole, inlays and appliances in general, one of the principal objectives lies in the provision of a device which accurately conforms, in the minutest detail, to the unique irregularities of contour and configuration which each specific case involves. In the case of a denture, for example, whether it be partial or whole, the device must conform accurately to every minute convolution and irregularity of shape or contour of the mouth and jaw structure of the particular individual for whom the denture is intended. Inlays, too, must obviously conform with as nearly perfect accuracy as is humanly possible to the irregularities of the cavity or tooth with which they are to be associated.

Accordingly, the creation of dental appliances of this general character usually involves the production of a pattern conforming exactly to the special configuration which is involved; and the consequent manufacture of the appliance in accurate conformity with the pattern. A swaging process is in many instances satisfactory, especially where a whole denture plate is to be provided. A casting procedure is, however, much more preferable as a general rule regardless of the type of dental appliance that is to be made, for the reason that greater accuracy and finer conformity with small irregularities can be attained, especially in the case of inlays, partial dentures, and the like.

My present invention has reference to cast dentures, and it will be understood that the term "denture" as herein used is intended to include within its significance all variety of dental appliances of the general character mentioned, whether they be inlays, crowns, complete or partial plates, or similar allied products.

The problems involved in the production of cast dentures are unique and specialized, since the finished product must comply with a large variety of requirements in order to be of practical value and of the character which the modern state of the art of mechanical dentistry calls for. Briefly, this type of article must embody a peculiar combination of the qualities of strength, resilience, toughness, and absence of brittleness, whose simultaneous achievement has always presented a problem to those skilled in the art. For example, the finished article must be sufficiently strong and resilient to yieldably withstand the severe strains and stresses to which it is subjected in use, and to insure a permanent maintenance of the desired initial accurate contour or configuration. The strength and resilience are of paramount importance to permit extremely thin and slender portions of the article to maintain their shape under the severe local loads which are constantly imposed during mastication and frequently by accidental impact. However, the resilience must be accompanied by an absence of brittleness, and, in fact, there must be sufficient toughness and ductility to withstand overloads and also to permit minor adjustments to be made in configuration, such as during adjustment of a tooth clasp or the like. Also, the article should preferably embody a high degree of rigidity, as measured by modulus of elasticity, so as to prevent undue deflection under imposed loads, especially at portions where a constant maintenance of initial accuracy is required. Furthermore, the device must have good heat conductivity; it must be homogeneous and sound throughout; and it should preferably be light in weight, and inexpensive.

In addition to the necessity for meeting the exacting requirements hereinbefore illustratively mentioned, the problem of making dentures is further complicated by the requirement that the material of which they are made be corrosion-resistant in character. Not only must the finished product withstand oxidation and the action of the acids and other chemicals to which its use will subject it, but it should preferably be of a material which will not discolor and which is capable of maintaining a highly polished and preferably lustrous surface.

Gold, and alloys of gold, have been widely used for many years for the reason that they best comply with most, although not all, of the essential requirements.

Where the denture is to be cast, the material to be employed must meet with still further requirements. Obviously, it must be of a character which is capable of being fused or melted in a practical manner. It must have the inherent ability to reharden and to cool without material shrinkage. Also, it must be of a homogeneous character which renders it adaptable to the production of sound castings; and, of course, it must be highly resistant to oxidation and corrosion, and embody the requisite strength, resilience, and other qualities hereinbefore referred to.

I have found that certain alloys of cobalt, especially alloys of cobalt with a metal or metals of the chromium group, are admirably suited for the purpose of making cast dentures, particularly where the consistencies and modes of use are carefully controlled and regulated in accordance with the details hereinafter contained.

It has been known for a number of years that cobalt will alloy satisfactorily with one or more of the metals of the chromium group, producing a hard, strong, lustrous, and corrosion-resistant material whose salient characteristics have been its ability to take and retain a cutting edge. Such alloys have therefore come into considerable use in the manufacture of cutlery, saws, lathe tools, and the like. So far as dental work is concerned, however, such alloys have never, so far as I am aware, proven to be feasible or satisfactory. They are, generally speaking, too hard and brittle, too difficult to fuse, and sometimes almost impossible to melt in a practical manner. Though somewhat satisfactorily adaptable to forging at high temperatures, they are, in general, utterly unsuitable for the production of practical results by fine and delicate casting procedures of the character which are involved in the production of dentures.

I have discovered, however, that highly satisfactory cast dentures of even the finest and most delicate grades can be formed of alloys of this general type where the chromium group ingredient is limited, roughly speaking, to about 10 to 40%, and where the casting procedure is carried out in any of the special modes hereinafter to be described.

For example, I have succeeded in satisfactorily casting dentures composed of a metallic alloy whose essential or principal ingredients are cobalt and chromium, the latter metal being present to the extent of no less than 10 nor more than 40%. I have found that the careful control of the amount of chromium affords the possibility of providing a denture having exactly those characteristics which best fit it for the purposes for which it is intended. Within the approximate range specified, smaller amounts of chromium lend softness and toughness to the denture and render the alloy admirably suited for such articles as inlays, crowns, etc.; while increased amounts of chromium impart correspondingly increased qualities of hardness and resilience to the product, thereby rendering the alloy eminently satisfactory for the production of slender bars, clasps, and other similar parts entering into bridge- and plate-work.

I have also ascertained that small quantities of other metals or non-metals may be advantageously incorporated with the alloy, without injuriously affecting the nature of the alloy, and, in many cases, advantageously modifying its properties and rendering it more suitable for special requirements. For example, manganese and silicon, usually present as accidental impurities in any event, may advantageously be increased to no more than 1% each. The manganese serves as a deoxidizer during the melting procedure and increases the fluidity of the molten metal. Silicon similarly increases the fluidity. Both manganese and silicon, however, have a tendency to make the alloy brittle, and the proportions should therefore be carefully preserved within the limit specified.

Similarly, carbon, which is usually present as an impurity, may serve to increase the wearing qualities of the finished article but should preferably be kept well below 1% to avoid brittleness.

To increase the toughness and softness of the alloy, for certain particular requirements, I have found it satisfactory to replace the cobalt in part by a metal of the group which comprises iron and nickel. Either iron or nickel, in an amount up to 25%, may be satisfactorily incorporated with the alloy. Nickel may be employed even up to 40%.

The cobalt may also be combined satisfactorily with more than one of the metals of the chromium group. Where chromium is employed, for example, as the essential ingredient, tungsten or molybdenum may sometimes be employed to serve as an additional ingredient, increasing the hardness and resilience of the product, but the amount of such an added ingredient should not exceed 5% and should preferably be below 3%.

In certain cases I have found it desirable to employ tantalum as an additional ingredient. It has substantially the same effect as tungsten or molybdenum in increasing the resilience of the product. When it is used, the amount should not exceed 5%, and should preferably be below 3%.

Merely as an example, the following specific ingredients, in substantially the proportions mentioned, have proven to produce a highly satisfactory alloy of the present character and for the achievement of the present general objectives:

| | |
|---|---|
| Chromium | 17.50 |
| Cobalt | 57.00 |
| Tungsten | 3.00 |
| Nickel | 21.00 |
| Iron | 1.00 |
| Carbon | .50 |
| | 100.00 |

The basic alloy of cobalt and a metal of the chromium group, where the latter ingredient is used within the limits herein illustratively specified is excellently adapted for my present purposes and obviates many of the disadvantages inherent in gold or gold alloys. Gold is popularly used because it is easy to melt and to cast; because it is noble in characteristics, and corrosion-resistant; and because it creates the impression of being of high quality. It has the tendency to discolor, however, especially when alloyed, as it usually is, with copper or the like; it is relatively expensive; it is somewhat lacking in rigidity; and, of course, it is exceptionally heavy.

The present material embodies not only a remarkable strength, resilience, and toughness, permitting even extremely slender denture portions to be cast without sacrifice of form preservation, but it is utterly unsusceptible to discloration in the mouth; it is comparatively light in weight; and it is relatively inexpensive.

Furthermore, its modulus of elasticity is very high, approaching that of steel, whereas the modulus of elasticity of gold alloys is relatively low. As a result, small elastic parts, such as arms of clasps, may be made exceedingly thin while at the same time they retain sufficient stiffness to be useful. The high degree of rigidity is particularly desirable in parts such as lingual and palatal bars.

The present material embodies also the other specific desirable characteristics which the production of cast dentures calls for. It is highly resistant to corrosion, withstanding even the action of concentrated, boiling nitric acid. It is unaffected by cold sulfuric acid. It undergoes an unusually slight shrinkage during transition from the molten to the solid condition and during the cooling of the casting. It is inherently homogeneous and sound. And it has a relatively great heat conductivity.

In making a cast denture of a material whose essential ingredients are, as specified, cobalt and a metal of the chromium group, it is essential to employ a mold of a high refractoriness. Whereas the ordinary plaster silica mold, used for gold, will generally withstand preliminary heating up to 1400° F. to drive off gases, the mold which I prefer to employ is one which will withstand a preliminary heating up to 1600° F. This additional preliminary heating serves not only to drive off the gases more efficiently and completely, but it seems to expand the mold by just the proper amount to compensate for the corresponding slight shrinkage that the present alloy undergoes in setting and cooling. I prefer to employ a mold material composed of calcined or fused alumina, calcined or fused silica, or calcined or fused magnesia, with sodium silicate as a binding medium. Molds of plaster and magnesia and of plaster and alumina are also satisfactory, especially when they are lined with a special high-refractory material such as alumina, silica, or magnesia. Such a lining also renders a plaster-silica mold useful for the present purpose.

Since the present material fuses at a higher temperature than gold or its alloys, it is preferable to line the mouth of the mold with a highly refractory material and to melt the globule therein. I have also found it satisfactory to fuse the metal in a separate crucible or cup of highly refractory character, arranged alongside of or above the mouth of the mold.

Because of the higher temperature of the molten metal, the rate of cooling is greater than that ordinarily encountered with gold or gold alloy. Special care must therefore be taken to force the molten material speedily and promptly into the mold. This can be accomplished, for example, by using a greater gas pressure means or by forcing the material into the mold with an increased centrifugal force.

A particular feature of my present process lies in a preferred procedure whereby the metal is melted in a vacuum, and whereby it is thereupon promptly and speedily forced into a mold from which all gases have been exhausted. I have found that this method of use has a remarkable and unique effect upon a material of the present character, because it not only produces a sounder and more homogeneous casting, devoid of pipes and porosity, but it imparts to the finished product a toughness and resilience which is not otherwise achievable, so far as I am aware. In other words, the present material, when melted and cast in a vacuum, becomes imbued with properties desirable for my present purpose and not achievable to the same degree where ordinary casting procedures are resorted to.

The vacuum casting procedure has other advantages in connection with the use of the herein described material in that the molten metal is more quickly permitted to enter a delicate mold. Since no gases impede its passage, it fills even the smallest and thinnest portions of the mold with great rapidity and without any of the non-homogeneity which might otherwise result.

It will thus be seen that I have provided a method of producing dentures of extreme practical value. The inherent strength and other characteristics of the material make it possible to produce the thinnest and slenderest kinds of denture parts without sacrifice of inherent strength, rigidity, or resilience. The method of carrying out the casting procedure, preferably by melting and casting the material in a vacuum, permits the material to be cast into these slender shapes with facility and with not only preservation but enhancement of the inherent desirable qualities of the material itself.

It will be obvious that changes in the details herein described for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention, what I claim as new and desire to secure by Letters Patent is—

1. As a new article of manufacture, an artificial cast denture to be used inside the mouth, said denture comprising an alloy having a cobalt content of more than fifty percent and including chromium ten to forty per cent, said denture having the characteristic of slight shrinkage in solidifying to provide accuracy of fit and conformity to the mouth and alveolar processes.

2. As a new article of manufacture, an artificial cast denture to be used inside the mouth, said denture comprising an alloy having a cobalt content of more than fifty per cent, including chromium ten to forty percent and tungsten, said denture having the characteristic of slight shrinkage in solidifying to provide accuracy of fit and conformity to the mouth and alveolar processes substantially without allowance for shrinkage.

3. As a new article of manufacture, a denture comprising an alloy having cobalt as the principal constituent and containing chromium approximately ten to forty per cent, said alloy denture having the characteristic of slight shrinkage in solidifying.

4. As a new article of manufacture, a denture comprising an alloy having cobalt as the principal constituent and containing chromium approximately ten to forty per cent, and molybdenum up to approximately 5%, said alloy denture having the characteristic of slight shrinkage in solidifying.

5. As a new article of manufacture, a denture comprising an alloy having cobalt as the principal constituent and containing chromium approximately 10 to 40 per cent, and tungsten up to approximately 5 per cent, said alloy denture having the characteristic of slight shrinkage in solidifying.

CHARLES H. PRANGE.